United States Patent [19]

Van Leeuwen et al.

[11] Patent Number: 5,539,340
[45] Date of Patent: Jul. 23, 1996

[54] CIRCUIT FOR DETECTING PULSES, AND VIDEO RECORDER COMPRISING THE CIRCUIT

[75] Inventors: Pieter G. Van Leeuwen; Christian H. P. Baeten; Eduard Van Loo; Johannes P. M. Inghels, all of Eindhoven, Netherlands

[73] Assignee: U.S. Philips Corporation, New York, N.Y.

[21] Appl. No.: 332,615

[22] Filed: Oct. 31, 1994

Related U.S. Application Data

[63] Continuation of Ser. No. 126,147, Sep. 23, 1993, abandoned, which is a continuation of Ser. No. 578,052, Sep. 5, 1990, abandoned.

[30] Foreign Application Priority Data

Sep. 5, 1989 [NL] Netherlands .......................... 8902225

[51] Int. Cl.⁶ .............................. H03K 5/19; G01R 19/17
[52] U.S. Cl. .................................. 327/74; 327/52; 327/63; 377/44; 377/16
[58] Field of Search .................................. 307/350, 360, 307/362, 355; 360/70, 75; 377/12, 15, 16, 17, 107, 44, 39, 41, 56; 328/115, 116, 117; 327/50, 52, 56, 60, 63, 64, 65, 72, 74, 77, 78, 89

[56] References Cited

U.S. PATENT DOCUMENTS

| 4,574,206 | 3/1986 | Todokoro et al. | 307/360 |
| 4,924,483 | 5/1990 | Cho | 307/360 |
| 5,003,196 | 3/1991 | Kawaguchi | 327/60 |

FOREIGN PATENT DOCUMENTS 2120030  11/1983  United Kingdom ............. H03K 5/08

*Primary Examiner*—Timothy P. Callahan
*Assistant Examiner*—My-Trang Nu Ton
*Attorney, Agent, or Firm*—David Schreiber

[57] ABSTRACT

A circuit for detecting pulses in an electric input signal, which pulses are superposed on a specific reference level ($U_{ref}$), has an input terminal for receiving the electric input signal, at least a first and a second comparator device, switching means ($S_1$), an output terminal and control signal generator means. The control signal generator means supply a control signal to the switching means (S1) to control the position of the switching means. The input terminal (1) is coupled to a first input of the comparator devices, whose outputs are coupled to a terminal (c and a respectively) of the switching means ($S_1$). The output terminal (b) of the switching means is coupled to the output terminal. The first comparator device transfers only pulses whose relative amplitude in relation to the reference level exceeds a first value ($U_{D1}$). The second comparator device transfers only pulses whose relative amplitude in relation to the reference level exceeds a second value ($U_{D2}$). When input terminal receives N1 consecutive pulses whose amplitude relative to the reference level exceeds a specific (third) value ($U_{D3}$) the switching means ($S_1$) have been/are set to position c-b in such a manner that the first comparator is coupled to the output terminal. When subsequently N2 consecutive pulses are counted whose relative amplitude lies between a fourth and a fifth value ($U_{D4}$ and $U_{D5}$ respectively), such that $U^{D5} < U_{D4} < U_{D3}$, the switching means ($S_1$) have been/are set to position a-b in such a manner that the second comparator device is coupled to the output terminal. N1 and N2 are integers larger than or equal to 1.

40 Claims, 7 Drawing Sheets

| ampl | A | B | S₁ | S₂ |
|---|---|---|---|---|
| $> U_{D3}$ | 1 | 1 | c–b | a–b |
| $U_{D4} < ampl < U_{D3}$ | 0 | 1 | c–b | a–b |
| $U_{D5} < ampl < U_{D4}$ | 0 | 0 | a–b | c–b |
| $U_{D4} < ampl < U_{D3}$ | 0 | 1 | a–b | c–b |
| $> U_{D3}$ | 1 | 1 | c–b | a–b |

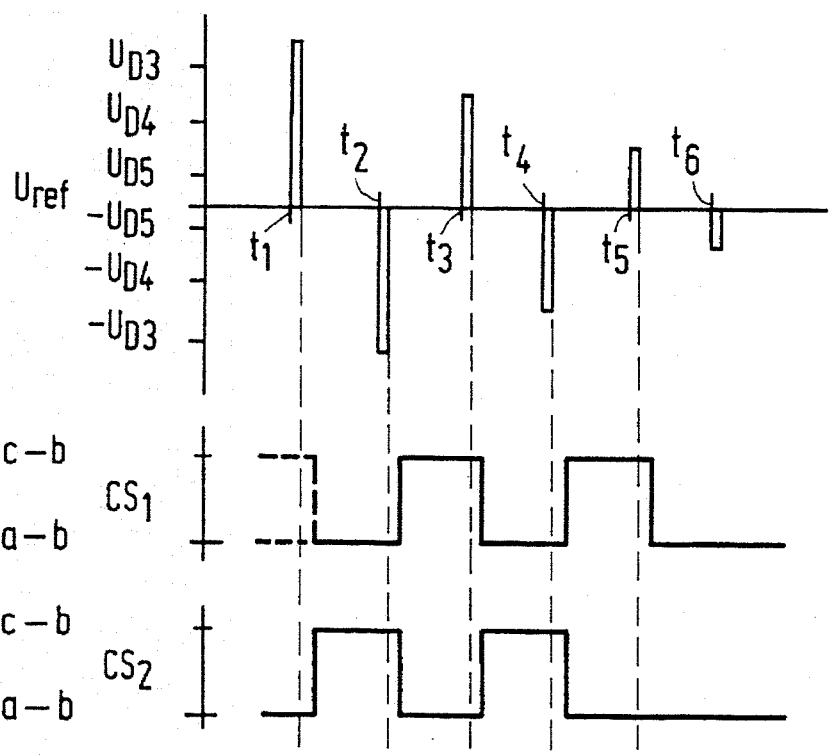
FIG.8a
FIG.8b
FIG.8c
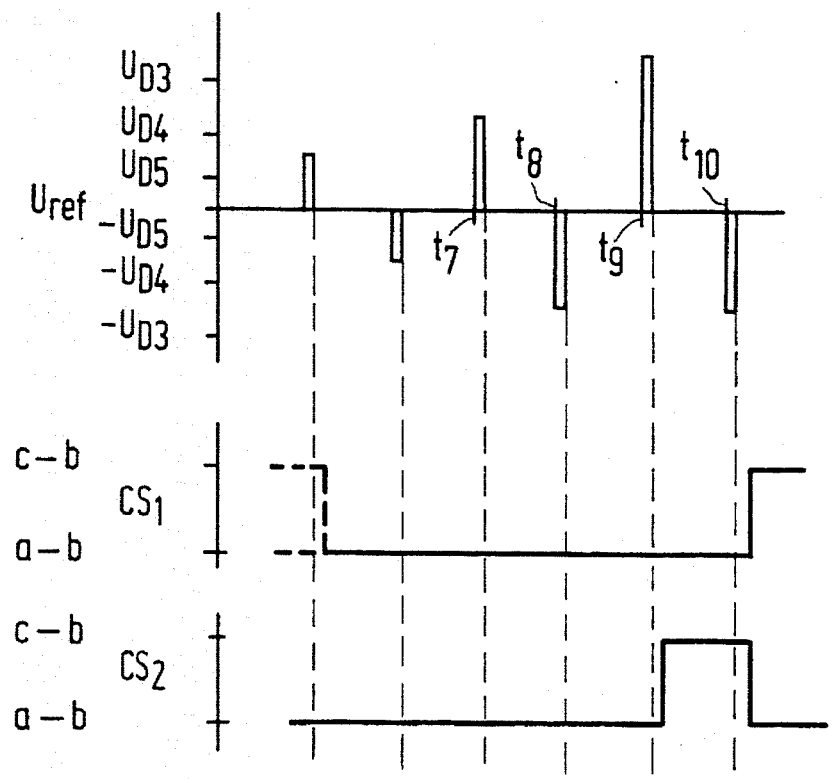
FIG.8d
FIG.8e
FIG.8f

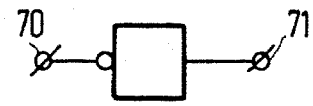
FIG.10a
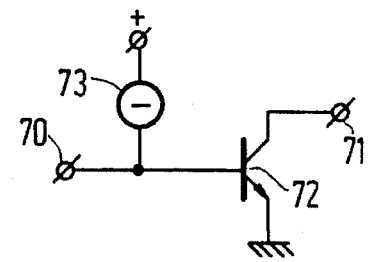
FIG.10b
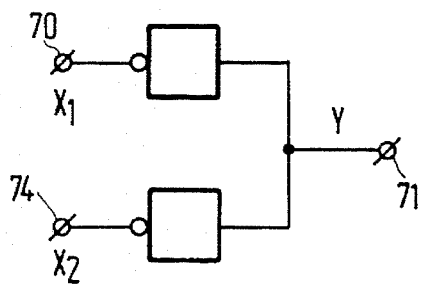
FIG.11a
| $X_1$ | $X_2$ | Y |
|---|---|---|
| 0 | 0 | 1 |
| 0 | 1 | 0 |
| 1 | 0 | 0 |
| 1 | 1 | 0 |
FIG.11b
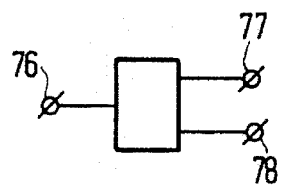
FIG.12a
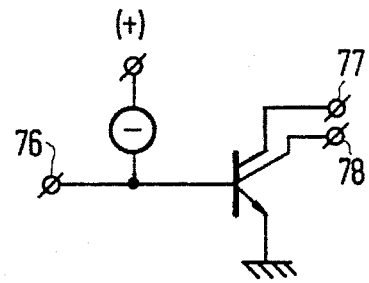
FIG.12b
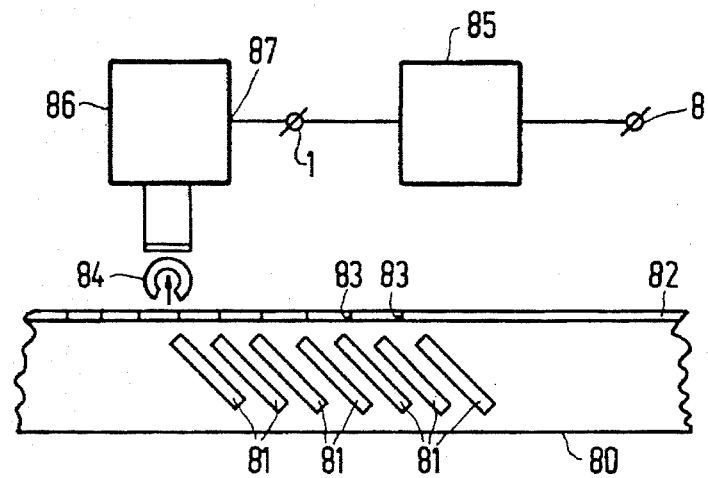
FIG.13

CIRCUIT FOR DETECTING PULSES, AND VIDEO RECORDER COMPRISING THE CIRCUIT

This is a continuation of application Ser. No. 08/126,147 now abandoned, filed Sep. 23, 1993 which is a continuation of Ser. No. 07/578,052 filed Sep. 5, 1990 now abandoned.

BACKGROUND OF THE INVENTION

The invention relates to a circuit for detecting pulses in an electric input signal, superposed on a specific reference level. The circuit has an input terminal for receiving the electric input signal, and to a video recorder comprising the circuit. The use in a video recorder is intended in particular for reading CTL pulses recorded on a separate track which extends at the edge of and in the longitudinal direction of the magnetic record carrier over this record carrier.

These CTL pulses are read in order to ensure that the video heads correctly follow the video tracks which extend obliquely on the magnetic tape. Moreover, these pulses can be read in order to be used in the VISS or VASS option of VHS video recorders (VISS and VASS meaning VHS index/address search system). Reading the CTL pulses sometime presents problems because these pulses may have different amplitudes and pulse widths at different tape speeds.

It is an object of the invention to provide a pulse-detection circuit which is capable of correctly detecting pulses whose amplitude and width vary as function of time.

SUMMARY OF THE INVENTION

To this end the circuit in accordance with the invention is characterized in that the circuit comprises at least a first and a second comparator device, each comparator devices having a first input coupled to an input terminal, at least a second input, and an output, the second input of each comparator device being coupled to a point of constant potential, in that the first comparator device is adapted to supply a first electric signal on its output exclusively when the input terminal receives a pulse whose relative amplitude in relation to the reference level exceeds a specific first value. The second comparator device is adapted to supply a second electric signal on its output when the input terminal receives a pulse whose relative amplitude in relation to the reference level exceeds a specific second value, the first value being larger than the second value. The outputs of the first and tile second comparator devices are coupled respectively to a first input and a second input of a switching means having an output coupled to an output terminal of the circuit, so that the circuit comprises means for generating a control signal on an output and for supplying said control signal to a control signal input of the switching means, in that the input terminal is coupled to an input of the control signal generator means, and in that the control signal generator means are adapted to generate a control signal to be supplied to the switching means in such a way that when the input terminal receives N1 pulses whose relative amplitude in relation to the reference level exceeds a third value, the switching means have been or are set to a position in which the first input and the output are coupled to each other, N1 being an integer larger than or equal to 1. The invention is based on the fact that there may be a substantial spread in pulse amplitude for different recorders or different magnetic tapes and for different speeds of transport of the magnetic tape past the read head. Moreover, in the last mentioned case the pulses are distorted, which distortion manifests itself inter alia in pulse widening in the case of high tape speeds. Therefore, the circuit in accordance with the invention monitors the magnitude of tile pulses and on the basis thereof selects a high or a low detection level. The basic idea that it is ascertained whether N1 pulses of a "high level", i.e. of a relative amplitude larger than the third value, are applied. In that case the high detection level is selected. This means: the first value. Pulses of an amplitude higher than the first value are then detected by the circuit and transferred to the output for further processing of these pulses, and pulses of an amplitude smaller than the first value are not transferred.

If $N_1$ is larger than 1, the $N_1$ pulses may be $N_1$ directly succeeding pulses. Another possibility is to check whether $N_1$ pulses larger than the third value occur in a specific time interval. Yet another possibility is to check whether there are $N_1$ pulses larger than the third value in cycles of $N_1+x$ pulses, x being an integer larger than or equal to 1.

Starting from the basic idea several further modifications are possible.

A first modification provides a possibility of resetting to the situation in which the second input and the output are coupled to each other.

To this end the circuit in accordance with the invention is characterized in that the control signal generator means are adapted to generate a control signal for the switching means in such a way that when the input terminal receives N2 pulses whose relative amplitude in relation to the reference level is situated between a fourth and a fifth value the switching means have been or are set to a position in which the second input and the output are coupled to each other, N2 being an integer larger than or equal to 1, and in that the third value is larger than or equal to the fourth value and the fourth value is larger than the fifth value. What has been stated above with respect to pulse counting also applies to the present case. The $N_2$ pulses may therefore be $N_2$ successive pulses, or $N_2$ pulses situated within a specific time interval or $N_2$ pulses within cycles of N2+y pulses each, y being an integer larger than or equal to 1.

According to the invention N2 pulses having a "low level" are then counted, i.e. having a relative amplitude between the fourth and the fifth value, after which a changeover to the low detection level is effected. This means: the second value. Pulses of an amplitude larger than the second value are then transferred by the circuit. Pulses of an amplitude smaller than the second value are not transferred. The third value may be selected to be at least substantially equal to the fourth value.

The circuit may be characterized further in that the control signal generator means comprise a first and a second counter, in that the first counter is adapted to count pulses of a relative amplitude larger than the third value and to deliver a signal on an output after N1 of said pulses have been counted, the second counter is adapted to count pulses of a relative amplitude between the third and the fifth value and to deliver a signal on an output after N2 of said pulses have been counted, and in that the output of the first counter is coupled to the output of the control signal generator means. The circuit can be simplified by selecting the first value to be substantially equal to the third value and the second value to be at least substantially to the fifth value. This requires two comparator devices, which can be used both for detecting the pulses and for deriving the control signal.

Such a circuit may be characterized further in that the output of the first comparator device is coupled to the input of the first counter and the output of the second comparator device is coupled to the input of the second counter. Moreover, the outputs of the first and the second comparator devices may be coupled, via an AND gate, to the input of the first counter and to a reset input of the second counter, and the output of the second counter may be coupled to a reset input of the first counter.

If the circuit should detect pulses which have always one specific polarity relative to the reference level the comparator devices require only one comparator each.

A circuit which should detect pulses which may have both a positive and a negative polarity relative to the reference level may be characterized in that the comparator devices each comprise two comparators, each comparator having a first and a second input and an output, in that the first inputs of the comparators are coupled to the input terminal, the second input of the first comparator in the first comparator device is coupled to the second input of the first comparator device, the second input of the second comparator in the first comparator device is coupled to a third input of the first comparator device, the second input of the first comparator in the second comparator device is coupled to the second input of the second comparator device, the second input of the second comparator in the second comparator device is coupled to a third input of the second comparator device, in that the third inputs of the first and the second comparator device are each coupled to a point of constant potential, in that the outputs of the first and the second comparator in each of the comparator devices are coupled to the output of the comparator device via a signal combination element, the first and the second comparator in the first comparator device are adapted to generate a third and a fourth electric signal respectively exclusively when the input terminal receives a pulse whose amplitude relative to the reference level exceeds said first value in a positive and a negative sense, respectively, relative to the reference level, and in that the first and the second comparator in the second comparator device are adapted to generate a fifth and a sixth electric signal respectively, when the input terminal receives a pulse whose amplitude relative to the reference level exceeds said second value in a positive sense and in a negative sense, respectively, relative to the reference level. Again the second value may be at least substantially equal to the fifth value. In this case the circuit may be characterized further in that the outputs of the first comparators in the two comparator devices are coupled to a first input of an OR gate via an AND gate, the outputs of the second comparators in the two comparator devices are coupled to a second input of the OR gate via a second AND gate, in that an output of the OR gate is coupled to the input of the first counter and to a reset input of the second counter, in that the outputs of the first and the second comparator in the second comparator device are coupled to an input of the second counter via a second OR gate, and in that an output of the second counter is coupled to a reset input of the first counter.

In another modification of the invention the third value may be selected to be larger than the fourth value. This introduces a voltage hysteresis in the control signal generator means. The circuit may then be characterized in that the control signal generator means comprise a first and a second comparator device, each having a first input coupled to the input terminal, at least a second input coupled to a point of constant potential, and an output, in that the outputs of the first and the second comparator devices in the control signal generator means are coupled to a first and a second input of a signal combination unit, which has an output coupled to the output of the control signal generator means, in that the first comparator device in the control signal generator means is adapted to supply a third electric signal when the input terminal receives a pulse whose amplitude relative to the reference level exceeds the third value, in that the second comparator device in the control signal generator means is adapted to supply a fourth electric signal upon when the input terminal receives a pulse whose amplitude relative to the reference level is situated between the a third and the fourth value, in that after the input terminal has received N1 pulses whose relative amplitude exceeds the third value the control signal generator means are adapted to generate a control signal in such a manner that after the input terminal has received a subsequent pulse whose relative amplitude exceeds the fourth value the switching means remain in a position in which the first input is coupled to the output, and in that the third value is larger than the fourth value.

Switching back to the low detection level can be achieved by means of a circuit which is characterized in that the second comparator device is further adapted to supply a fifth electric signal when the input terminal receives a pulse whose amplitude relative to the reference level is situated between the fourth and the fifth value, in that after the input terminal has received $N_2$ pulses whose relative amplitude is situated between the fourth and the fifth value the control signal generator means are adapted to generate a control signal in such a manner that when the input receives a subsequent pulse whose relative amplitude is smaller than the third value the switching means remain in a position in which the second input is coupled to the output.

Another embodiment of the circuit with voltage hysteresis in the control signal generator means may be characterized in that $N_1=1$, in that the comparator devices each comprise two comparators, each comparator having a first and a second input and an output, in that the first inputs of the comparators are coupled to the input terminal, the second input of the first comparator in the first comparator device is coupled to the second input of the first comparator device, the second input of the second comparator in the first comparator device is coupled to a third input of the first comparator device, the second input of the first comparator in the second comparator device is coupled to the second input of the second comparator device, the second input of the second comparator in the second comparator device is coupled to a third input of the second comparator device, in that the third inputs of the first and the second comparator device are each coupled to a point of constant potential, in that the outputs of the first and the second comparator in the first comparator device are coupled respectively to a first and a second sub-input of the first input of the switching means, the outputs of the first and second comparator in the second comparator device are coupled respectively to a first and a second sub-input of the second input of the switching means, the first and the second comparator in the first comparator device are adapted to generate a sixth and a seventh electric signal exclusively when the input terminal receives a pulse whose amplitude relative to the reference level exceeds said first value in a positive or negative sense, respectively, relative to the reference level, and in that the first and the second comparator in the second comparator device are adapted to generate an eighth and a ninth electric signal respectively when the input terminal receives a pulse whose amplitude relative to the reference level exceeds said second value in a positive and a negative sense, respectively, relative to the reference level, in that the first and the second comparator devices in the control signal generator means each comprise two comparators, each comparator having at least a first and a second input and an output, in that the first inputs of the comparators are coupled to the input terminal, the second input of the first comparator in the first comparator device is coupled to the second input of the first comparator device, the second input of the second comparator in the first comparator device is coupled to a third input of the first comparator device, the second input of the first comparator in the second comparator device is coupled to the second input of the second comparator device, the second input of the second comparator in the second comparator device is coupled to a third input of the second comparator device, in that the third inputs of the first and the second comparator device are each coupled to a point of constant potential, in that the outputs of the first and the second comparator in each of the comparator devices are coupled, via signal combination element, to the output of the control signal generator means, the first and the second comparator in the first comparator device are adapted to generate a tenth and an eleventh electric signal respectively exclusively when the input terminal receives a pulse whose amplitude relative to the reference level exceeds said third value in a positive and a negative sense, respectively, relative to the reference level, and in that the first and the second comparator in the second comparator device are adapted to generate a twelfth and a thirteenth electric signal respectively when the input terminal receives a pulse whose amplitude, in a positive and a negative sense relative to the reference level respectively, is situated between the third and the fourth value, and in that the signal combination unit is adapted to generate a control signal from the tenth through the thirteenth signal in such a manner that when the input terminal receives a pulse whose relative amplitude exceeds the third value in a positive sense relative to the reference value the switching means have been or are set to a position in which the second sub-input of the first input is coupled to the output, in that when the input terminal receives a pulse whose relative amplitude exceeds the third value in a negative sense relative to the reference value the switching means have been or are set to a position in which the first sub-input of the first input is coupled to the output. In this case the hysteresis effect manifests itself in that after the input terminal has receives a pulse whose relative amplitude in relation to the reference level exceeds the third value in a positive sense relative to said reference level the control signal generator means are adapted to generate a control signal in such a manner that after the input terminal has received a subsequent pulse whose relative amplitude in relation to the reference level exceeds the fourth value in a negative sense relative to said reference level the switching means have been or are set to a position in which the first sub-input of the first input is coupled to the output and in that after the input terminal has received a pulse whose relative amplitude in relation to the reference level exceeds the third value in a negative sense relative to said reference level the control signal generator means are adapted to generate a control signal in such a manner that after the input terminal has received a subsequent pulse whose relative amplitude in relation to the reference level exceeds the fourth value in a positive sense relative to said reference level the switching means have been or are set to a position in which the second sub-input of the first input is coupled to the output.

Switching back to the low detection level can then be achieved in that after reception of a positive pulse relative to the reference level the control signal generator means are adapted to generate a control signal such that the switching means have been or are set to a position in which the first sub-input of the second input is coupled to the output, and in that after reception of a negative pulse relative to the reference level the control signal generator means are adapted to generate a control signal such that the switching means have been or are set to a position in which the second sub-input of/he second input is coupled to the output.

BRIEF DESCRIPTION OF THE DRAWINGS

Embodiments of the circuit in accordance with the invention will now be described in more detail, by way of example, with reference to the accompanying drawings. In the drawings FIGS. 8a–8f shows the switch positions of the switches in the circuit shown in FIG. 7 for a number of possible pulse amplitudes applied to the input terminal, FIGS. 10a, 10b, 11a, 11b, and 12a, 12b show a number of elements for use in the circuit shown in FIG. 9, and FIG. 13 shows the circuit in accordance with the invention used in a video recorder.

DETAILED DESCRIPTION OF A PREFERRED EMBODIMENT

Figure 1:
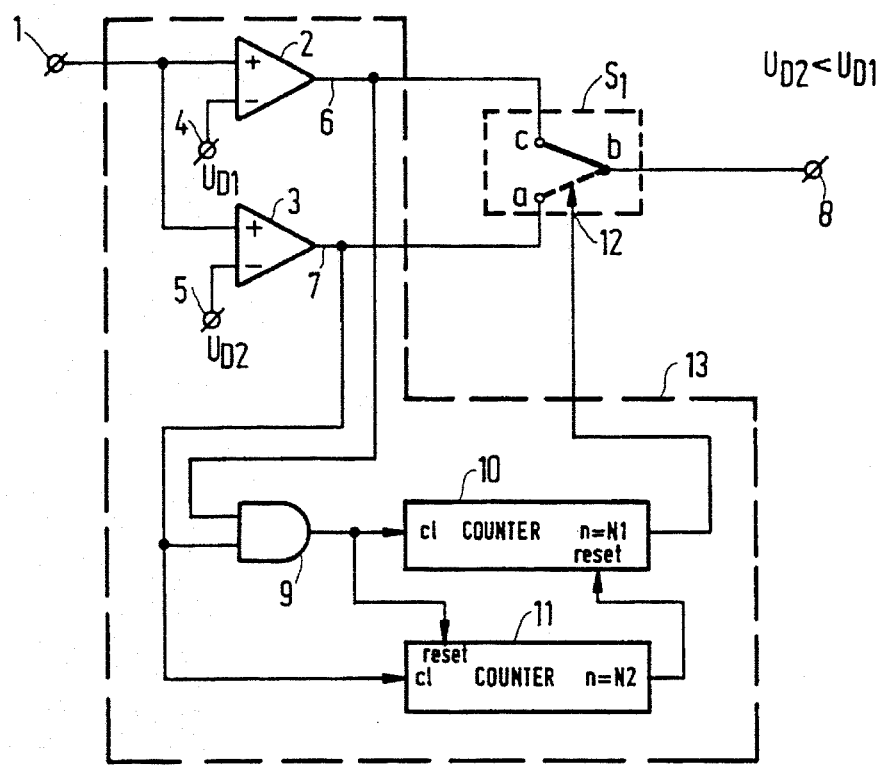
FIG. 1 shows an embodiment of the circuit for detecting pulses of a single polarity relative to the reference level.

FIG. 1 shows a first embodiment of a circuit having an input terminal coupled to a first inputs (+) of a first and a second comparator device 2 and 3 respectively. The two comparator devices each comprise one comparator. A second input (−) of the first comparator device 2 is coupled to a point 4 of constant potential. A second input (−) of the second comparator device 3 is coupled to a point 5 of constant potential. Outputs 6 and 7 of the comparator device 2 and 3 respectively are coupled to respective inputs c and a of switching means $S_1$ in the form of a controllable switch. An output b of the switch $S_1$ is coupled to an output terminal 8 of the circuit. The outputs 6 and 7 are also coupled to inputs of an AND gate 9, which has an output coupled to a count input cl of a counter 10 and to a reset input of a counter 11. Moreover, the output 7 is coupled to a count input cl of the counter 11. An "n=N2" output of the counter 11 is coupled to a reset input of the counter 10 and an "n=N1"

output of the counter 10 is coupled to a control signal input 12 of the switch S1.

The comparator 2 is adapted to supply a first electric signal (a logic "1" signal) exclusively if the input terminal 1 receives pulses shows relative amplitude in relation to the reference level $U_{ref}$ exceeds a first value. A potential $U_{D1}$ is how applied to the point 4. The first value is then equal to $U_{D1}-U_{ref}$. $U_{ref}$ need not necessarily be zero volts, but may alternatively be a specific non-zero direct voltage. It should be noted here that the word "exclusively" given above, means that the comparator 2 supplies the first electric signal only if the pulse exceeds the first value. The comparator 2 does not supply the first electric signal if the pulse has relative amplitude lower than the first value.

The comparator 3 is adapted to supply a second electric signal (a logic "1" signal) if the input terminal 1 receives pulses whose relative amplitude in relation to Uref exceeds a second value. Since the potential $U_{D2}$ is applied to point 5, the second value will be equal to $U_{D2}-U_{ref}$. In this embodiment the third, the fourth and the first value are equal to each other and the second value is equal to the fifth value.

Figure 2A:
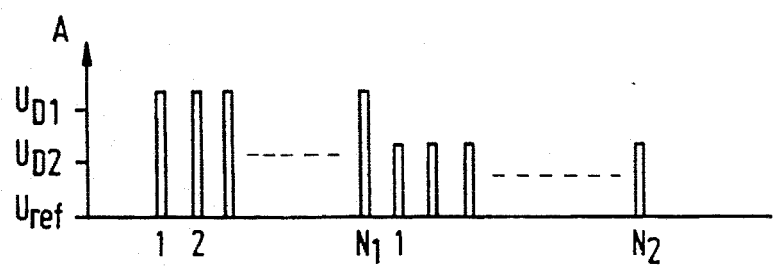
FIG. 2a shows the electric input signal and FIG. 2b shows the position of the switching means in the circuit shown in FIG. 1.
Figure 2B:
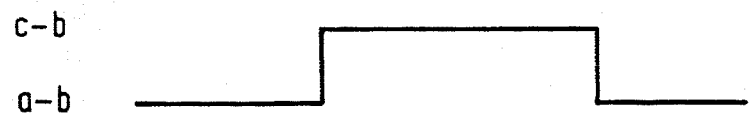

If the switch $S_1$ is positioned such that terminals a and b are coupled to each other, the counter N1 counts pulses having a relative amplitude larger than the third value. This means: those pulses which are larger than $U_{D1}$, see FIG. 2a. During this time interval, pulses which are detected by the comparator 3 and which consequently have an amplitude larger than $U_{D2}$ are transferred to the output terminal 8. After N1 successive pulses having an amplitude larger than $U_{D1}$ have been counted, a logic "1" signal appears on the "n=N1" output of the counter 10. The switch S1 is set to the position in which the terminals c and b are coupled to each other, see FIG. 2b. From this instant the pulses which are detected by the comparator 2 and which consequently have an amplitude larger than $U_{D1}$ are transferred to the output terminal 8. The count of the counter 10 then remains n=N1.

Now it is assumed that pulses having an amplitude between $U_{D1}$ and $U_{D2}$ are applied to the input terminal. The counter 11 can now count because no reset pulses are applied to the reset input of the counter 11 by the AND gate 9. At the instant at which N2 of such pulses have been counted the "n=N2" output of the counter 11 becomes logic "1" As a result of this, a reset signal is applied to the reset input of the counter 10, causing the counter 10 to be reset to "0" The switch S1 is now reset to the position in which the terminals a and b are coupled to each other, see FIG. 2b.

The control signal generator 13 shown in the circuit of FIG. 1 comprises the elements situated within the dashed block. It is obvious that the comparators which provide the pulse detection are also used for deriving the control signal which is applied to the control signal input 12 of the switch S1.

Figure 3:
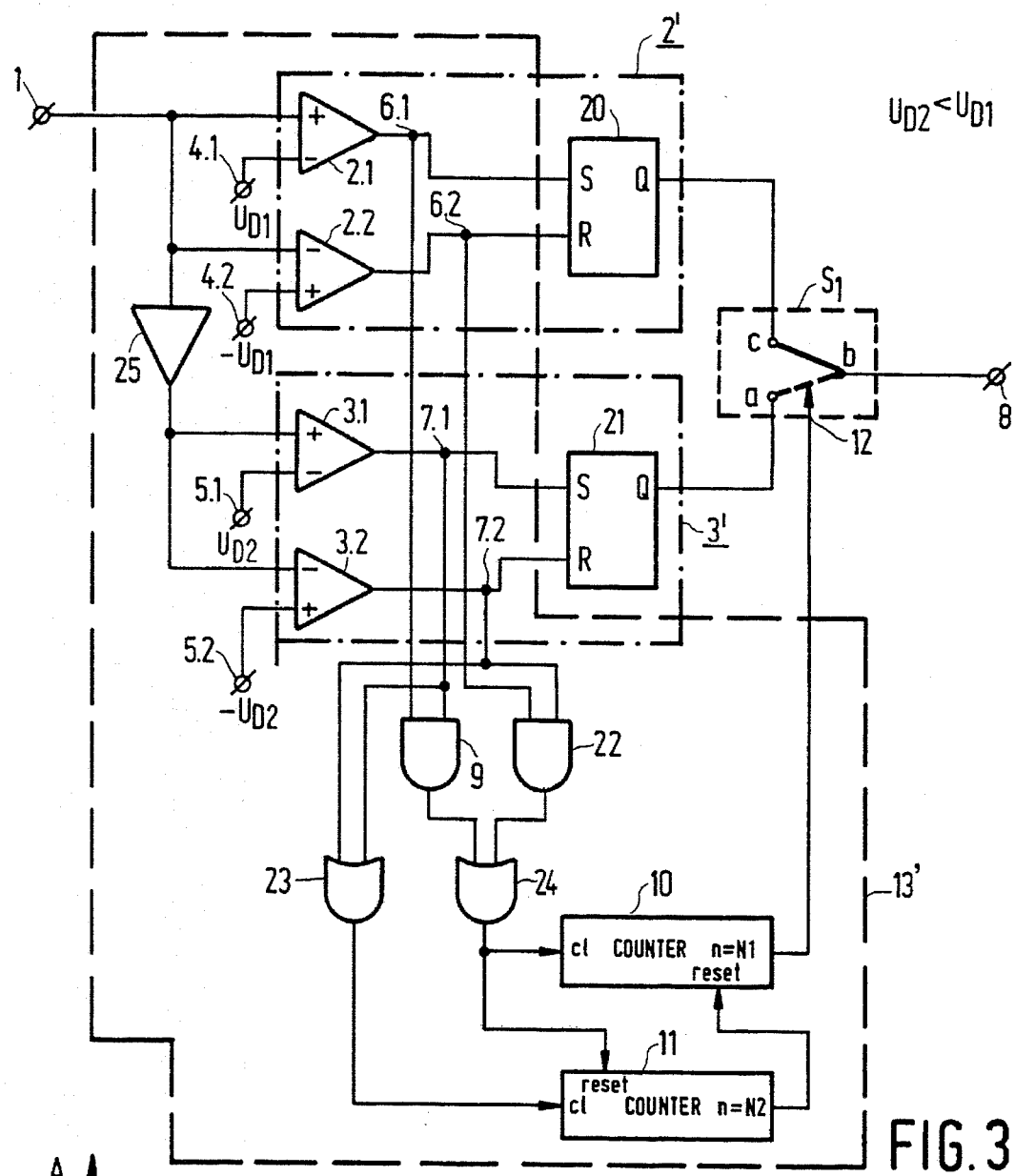
FIG. 3 shows an embodiment of a circuit for detecting pulses of positive and negative polarity relative to the reference level.

FIG. 3 shows the circuit of FIG. 1 extended to detect pulses of positive and negative polarity relative to the reference level $U_{ref}$. Here the first comparator device 2' comprises a first and a second comparator 2.1 and 2.2 respectively and an S-R flip-flop 20. The second comparator device 3' now comprises a first and a second comparator 3.1 and 3.2 respectively and an S-R flip-flop 21.

The input terminal 1 is coupled to the non-inverting inputs (+) of the comparators 2.1 and 3.1 and to the inverting inputs (−) of the comparators 2.2 and 3.2. The inverting inputs (−) of the comparators 2.1 and 3.1 are coupled to a point of constant potential, 4.1 and 5.1 respectively. The non-inverting inputs (+) of the comparators 2.2 and 3.2 are coupled to a point of constant potential, 4.2 and 5.2 respectively. The outputs 6,1 and 6.2 of the comparators 2.1 and 2.2 respectively are coupled to the set input and the reset input respectively of tile flip-flop 20. The Q-output of the flip-flop 20 is coupled to the input terminal c of the switch $S_1$. The outputs 7.1 and 7.2 of tile comparators 3.1 and 3.2 respectively are coupled to the set input and the reset input respectively of the flip-flop 21. The Q-output of the flip-flop 21 is coupled to the input terminal α of the switch $S_1$.

Figure 4A:
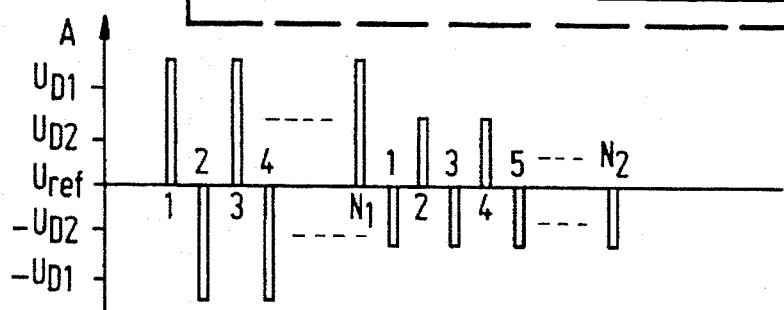
FIG. 4a shows the electric input signal and FIG. 4b shows the position of the switching means in the circuit shown in FIG. 3.
Figure 4B:

The outputs 6.1 and 7.1 of the comparators 2.1 and 3.1 respectively are coupled to the inputs of the AND gate 9. The outputs 6.2 and 7.2 of the comparators 2.2 and 3.2 respectively are coupled to inputs of an AND gate 22. The outputs of the two AND gates are coupled to the count input cl of the counter 10 via an OR gate 24. The outputs 7.1 and 7.2 of the comparators 3.1 and 3.2 respectively are coupled to the count input cl of the counter 11 via an OR gate 23. The pulses applied to the comparators 3.1 and 3.2 via the input terminal 1 are first amplified in an amplifier 25. In the case of an appropriate choice of the gain factor of the amplifier 25 equal potentials may be applied to points 4.1 and 5.1 and to points 4.2 and 5.2. Comparator 4.1 supplies a (third) electric signal (logic "1") when the input terminal 1 receives a pulse whose amplitude relative to the reference level $U_{ref}$ exceeds the first value (equal to $U_{D1-Uref}$) in a positive sense relative to $U_{ref}$. Moreover, it is evident that the comparator 4.2 supplies a (fourth) electric signal (logic "1") when the input terminal 1 receives a pulse whose amplitude relative to the reference level $U_{ref}$ exceeds the first value in a negative sense relative to $U_{ref}$. It is also obvious that the comparator 3.1 supplies a (fifth) electric signal (logic "1") when the input terminal 1 receives a pulse whose relative amplitude in relation to $U_{ref}$ exceeds the second value (equal to $U_{D2}-U_{ref}$) in a positive sense relative to $U_{ref}$. Moreover the comparator 3.2 supplies a (sixth) electric signal (logic "1") when the input terminal 1 receives a pulse whose relative amplitude in relation to $U_{ref}$ exceeds the second value in a negative sense relative to $U_{ref}$. The operation of the circuit shown in FIG. 3 is similar to that of the circuit shown in FIG. 1. When N1 pulses having amplitude relative to $U_{ref}$ larger than $U_{D1}$ are applied to the input terminal 1, see FIG. 4a, the counter 10 will count these pulses. At this instant the switch $S_1$ is in position a-b. After N1 of such pulses have been received, the switch $S_1$ changes over to the (other) position c-b in response to the control signal applied to the control signal input 12 of the switch $S_1$ by the counter 10, see FIG. 4b. If pulses of a relative amplitude between $U_{D2}$ and $U_{D1}$ are now applied to the input terminal 1, see FIG. 4a, the counter 11 will count these pulses. This is because in this case the OR gate 24 does not apply any reset pulses to the reset input of the counter 11. If the counter 11 has counted N2 successive pulses of an amplitude between $U_{D1}$ and $U_{D2}$, see FIG. 4a, the "n=N2" output of the counter 11 goes "high" so that the counter 10 is now set to zero, causing the switch S1 to be reset to position a-b.

However, since the outputs are followed by the S-R flip-flops 20 and 21, the pulses detected by the comparators are not transferred to the output terminal 8 but instead a squarewave is transferred whose rising and falling edges indicate the detection instants of the detected pulses. It is obvious that in the present embodiment the comparators 2.1, 2.2, 3.1 and 3.2 form part of the control signal generator means 13'.

Figure 1A:
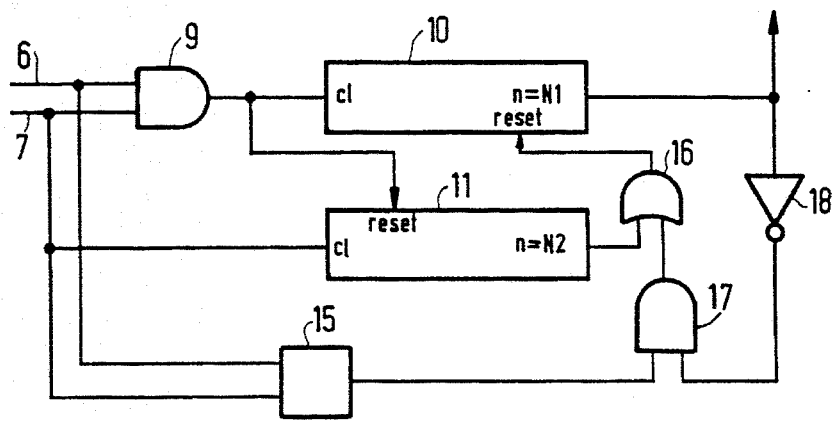
FIG. 1a shows the control signal generator means of the circuit in FIG. 1 in more detail.

In the embodiment shown in FIGS. 1 and 3, the counter 10 counts $N_1$ pulses of an amplitude larger than $U_{D1}$. These pulses need not necessarily be $N_1$ consecutive pulses of an amplitude larger than $U_{D1}$. The control signal generator means 13 and 13' may be adapted in such a way that the counter 10 can count only $N_1$ consecutive pulses of an amplitude larger than $U_{D1}$ before it supplies a "high" control signal to the control signal input 12 of the switching means $S_1$. For the embodiment shown in FIG. 1 this is indicated in FIG. 1a. FIG. 1a shows the control signal generator means 13 of FIG. 1 comprises a detector 15, an OR gate 16, an AND gate 17 and an inverter 18. The detector 15 is adapted to supply a "high" control signal if a pulse having an amplitude between $U_{D2}$ and $U_{D1}$ is applied to the input terminal 1. In the time interval in which the counter counts 10 pulses while the switch 5 is in position a-b the "n=N1" output of the counter 10 will be low. This means that, via the inverter 18, a "high" signal is applied to the AND gate 17. If now a pulse of small amplitude is applied, i.e. of an amplitude between $U_{D2}$ and $U_{D1}$, the detector 15 will supply a "high" control signal, which is applied to the reset input of the counter 10 via the AND gate 17 and the OR gate 16 to reset this counter to zero. The counter 10 reaches its final count only if N1 consecutive pulses of an amplitude larger than $U_{D1}$ are applied.

Figures 5, 6:
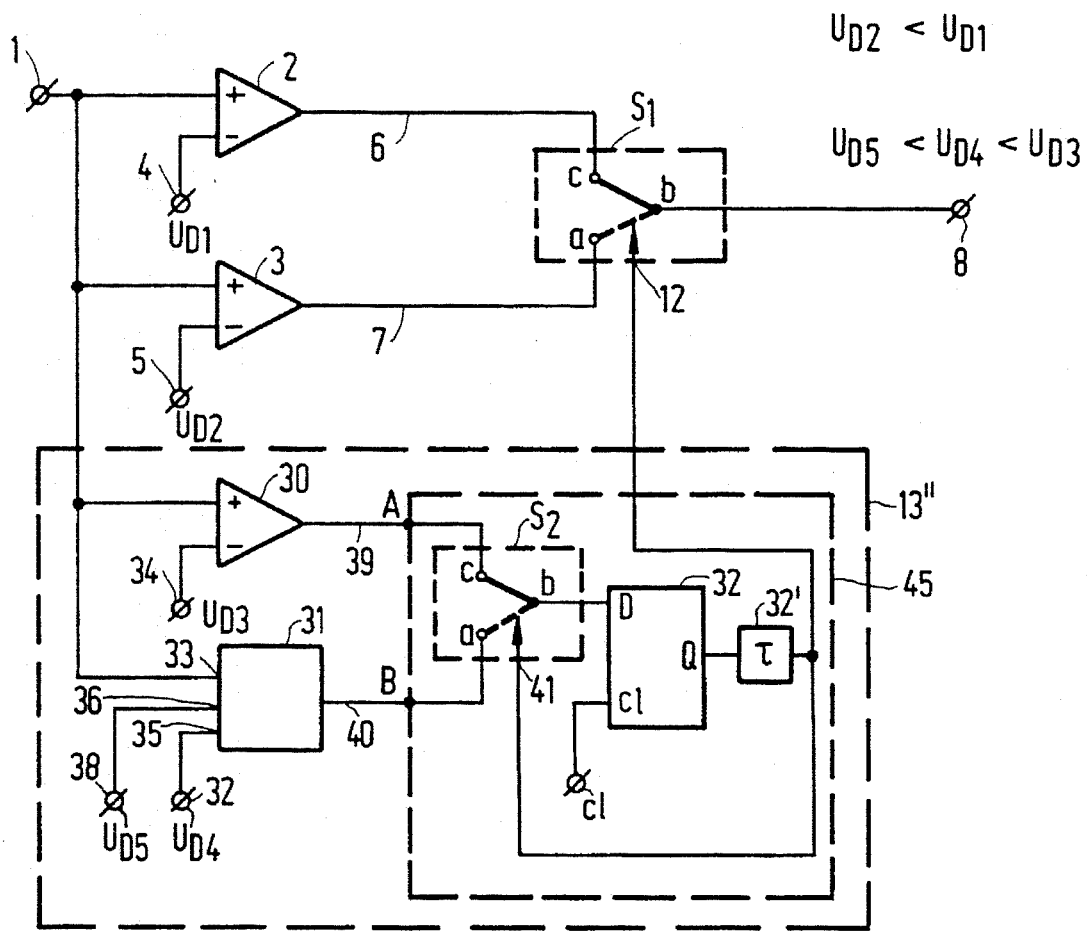
FIG. 5 shows an embodiment of a circuit for detecting pulses of a single polarity relative to the reference level, the control signal generator means exhibiting a voltage hysteresis.
FIG. 6 is a Table giving signal values on a number of points in the circuit shown in FIG. 5 and the corresponding positions of the switches in this circuit for a number of amplitude values of the pulses applied to the input terminal.

FIG. 5 shows an embodiment of a circuit for detecting the pulses of a single polarity relative to the reference level $U_{ref}$ and comprising control signal generator means with a voltage hysteresis It is assumed that N1=N2=1. However, it is to be noted that this is not necessary. If N1 and N2 are not equal to 1, the control signal generator 13", just like the control signal generator in the embodiments shown in FIGS. 1 and 3, should be provided with counters. In the present case the control signal generator 13" comprises a comparator device 30, a comparator device 31, switching means S2 and a D flip-flop 32, the two last-mentioned elements constituting the signal combination unit 45. The input terminal 1 is coupled to a first input (+) of the comparator device 30, which is constructed as a single comparator, and to a first input 23 of the second comparator device 31. The other (−) input of the comparator 30 is coupled to a point 34 of constant potential. A second input 35 and a third input 36 of the comparator 31 are coupled to points of constant potential 37 and 38 respectively. The outputs 39 and 40 of the comparators 30 and 31 are respectively coupled to the inputs c and a of the switch $S_2$. The output terminal b of the switch $S_2$ is coupled to the D input of the flip-flop 32. The Q output of the flip-flop 32 is coupled to the control signal input 12 of the switch $S_1$ and to the control signal input 41 of the switch $S_2$ via a delay 32'.

If the output signal of the flip-flop 32 is logic "1" the switch $S_1$ is in position c-b and the switch $S_2$ is in position a-b. If the output signal of the flip-flop 32 is logic "0", the switches $S_1$ and $S_2$ are in positions a-b and c-b respectively. The detection device, comprising the comparators 2 and 3 and the switch S1, again operates in the same way as the corresponding components in the circuit shown in FIG. 1.

The operation of the control signal generator 13" is illustrated by way of the Table in FIG. 6. The comparator 30 outputs a (third) signal (logic "1") if the pulse applied to the input terminal 1 has a relative amplitude, in relation to $U_{ref}$ larger than the third value, or if the amplitude of the pulse is larger than $U_{D3}$, i.e. the potential on point 34. This is indicated in column A in FIG. 6. This column specifies the output signal of the comparator 30.

The comparator 31 delivers a (fourth) electric signal, being logic "1", on its output if a pulse is an amplitude relative to $U_{ref}$ between the third value and the fourth value is applied to the input terminal 1. In other words: if the amplitude of the pulse is situated between $U_{D3}$ and $U_{D4}$. If a pulse having a relative amplitude between the fourth and the fifth value is applied to the input terminal 1 the comparator 31 will supply a (fifth) electric signal, being logic "0" All this is indicated in column B of the Table in FIG. 6. For a correct operation of the comparator 31 potentials equal to $U_{D4}$ and $U_{D5}$ are applied to the points 37 and 38 respectively. The various potentials comply with $U_{D5}<U_{D4}<U_{D3}$ and $U_{D2}<U_{D1}$. It is obvious that $U_{D1}$ may be selected to be equal to $U_{D1}$ and $U_{D5}$ to be equal to $U_{D2}$. Preferably, the choice $U_{D5} \leq U_{D2}<U_{D1}<U_{D4}<U_{D3}$ is made. The circuit operates as follows, assuming that the switches $S_1$ and $S_2$ are initially in positions a-b and c-b respectively. This means that the output of the flip-flop 32 is logic "0" It is also assumed that $U_{D5}$ is equal to $U_{D2}$. A pulse having an amplitude between $U_{D2}$ and $U_{D3}$ is applied to the input terminal 1. This pulse is transferred to the output terminal 8 via the comparator 3 and the switch $S_1$. Substantially at the instant at which the pulse is transferred to the input terminal 1 a clock pulse is derived, which is applied to the clock input cl of the flip-flop 32. Since the output 39 of the comparator 30 is logic "0" under the influence of the applied pulse, the Q output of the flip-flop 32 remains "0" after this clock pulse. If now a pulse of an amplitude larger than $U_{D3}$ is applied this pulse is also transferred to the output terminal 8 via the comparator 3 and the switch $S_1$. Moreover, the output of the comparator 30 goes "high" Upon the clock pulse which is now applied to the flip-flop 32, the logic "high" signal on the D input is transferred to the Q output so that the switches $S_1$ and $S_2$ change over to position c-b and a-b respectively after the delay time T. T should be such that the switching means do not yet change over during the applied pulse and have changed over before the next pulse. Since $U_{D4}>U_{D1}$ the comparator 2 and the switch $S_1$ will be transfer pulses of an amplitude larger than $U_{D4}$ to the output terminal. Moreover, the positions of the switches will not be changed. This is because the output of the comparator 31 remains logic "1", the output of this flip-flop will remains "1" and upon application of a clock pulse to the flip-flop 32.

If a pulse having an amplitude between $U_{D5}$ and $U_{D4}$ is applied to the input terminal 1 the output 40 of the comparator 31 will become logic "0" Upon the clock pulse which is then applied to the flip-flop 32 the Q output goes "low" so that the switches $S_1$ and $S_2$ are changed over to positions a-b and c-b respectively after the delay T. Subsequently, pulses of an amplitude between $U_{D5}$ and $U_{D3}$ will not affect the positions of the switches $S_1$ and $S_2$. This implies that a hysteresis is obtained in the range between $U_{D4}$ and $U_{D3}$. Depending on the prior situation the switch $S_1$ will in position c-b or, conversely, in position a-b for pulses in the amplitude range between $U_{D4}$ and $U_{D3}$.

The clock pulse cl applied to the flip-flop 32 may be derived, for example, from the output signal of the comparator having the smallest threshold value. If $U_{D5}$ is equal to $U_{D2}$ this may therefore be the comparator 3, For this purpose the output of the comparator 3 may be coupled to a monostable via a delay, which monostable has its output coupled to the clock input of the flip-flop 32. It is obvious that the delay should be selected in such a way that the clock pulse cl appears at such an instant that the pulse is still present on the input terminal 1. This means that the positions of the switches $S_1$ and $S_2$ in FIG. 6 relate to the pulse which follows the pulse having an amplitude as indicated in the left-hand column "ampl" in the Table given in FIG. 6.

Figure 7:
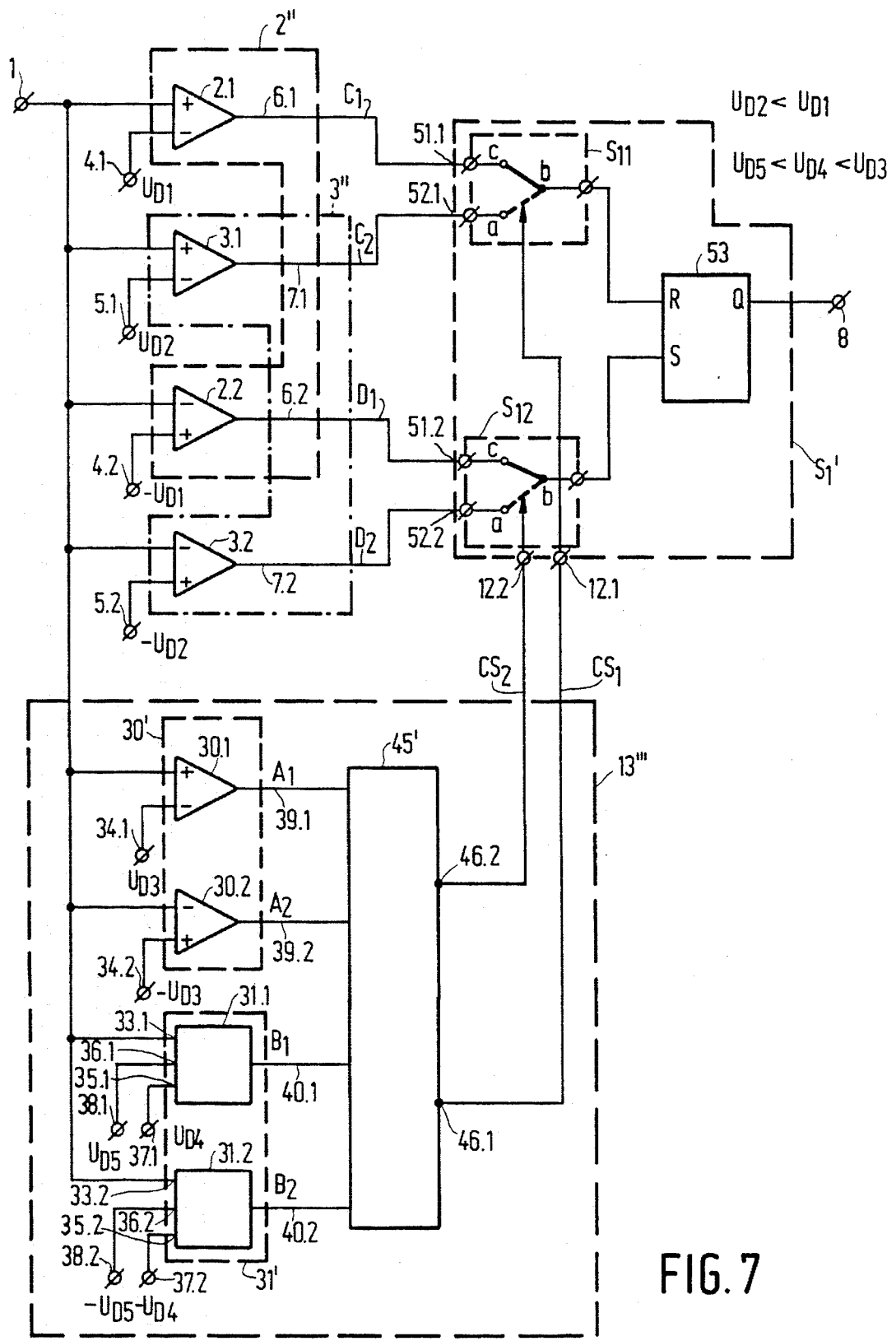
FIG. 7 shows an embodiment of a circuit for detecting pulses of positive and of negative polarity relative to the reference level, the control signal generator means also exhibiting a voltage hysteresis effect.

FIG. 7 shows a circuit for detecting pulses of positive and negative amplitudes relative to the reference level. This circuit also exhibits the hysteresis effect. Again the comparator device 2" comprises two comparators 2.1 and 2.2 having their outputs 6.1 and 6.2 coupled to respective inputs 51.1 and 51.2 of the switching means $S_1$. The comparator device 3'" again comprises two comparators 3.1 and 3.2, whose outputs 7.1 and 7.2 are coupled to respective inputs 52.1 and 52.2 of the switching means $S_1$ The switching means $S_1$ comprise two switches $S_{11}$ and $S_{12}$ and a flip-flop 53. The input 53.1, i.e. the first sub-input of the first input of 53, is coupled to the terminal c of the switch $S_{11}$. The input 52.1, being the first sub-input of the second input of the switching means $S_1$, is coupled to the terminal a of the switch $S_{11}$. The input 51.2, i.e. the second sub-input of the first input of the switching means $S_1$, is coupled to the terminal c of the switch $S_{12}$. The input 52.2, i.e. the second sub-input of the second input of the switching means $S_1$, is coupled to the terminal a of the switch $S_{12}$. The terminals b of the switches $S_{11}$ and $S_{12}$ are coupled to the set input and the reset input respectively of the flip-flop 53. The Q output of the flip-flop 53 constitutes the output of the switching means $S_1'$ which output is coupled to the output terminal 8.

The control signal generator means 13'" now comprise a first comparator device 30' comprising a first and a second comparator 30.1 and 30.2 respectively, a second comparator device 31' comprising a first and a second comparator 31.1 and 31.2 respectively, and a signal combination unit 45'.

The comparator 30.1 is identical to and operates in a manner similar to the comparator 30 in FIG. 5. The comparator 31.1 is identical to and operates similarly to the comparator 31 in FIG. 5. Likewise, the comparators 2.1 and 3.1 are identical to and operates similarly to the comparators 2 and 3 respectively in FIG. 5. The comparator 2.2 in FIG. 7 operates in the same way as the combination of the comparator 2.2 and the amplifier 25 in FIG. 3. Likewise, the comparator 3.2 in FIG. 7 operates in the same way as the combination of the comparator 3.2 in the amplifier 25 in FIG. 3. The comparator 30.2 has an inverting input coupled to the input terminal 1 and a non-inverting input coupled to the point 34.2 of constant potential. The potential $-U_{D3}$, which is referred to the reference level $U_{ref}$, is applied to said point. This comparator delivers an (eleventh) electric signal, logic "1", on its output 39.2 if a pulse applied to the input terminal 1 has an amplitude which exceeds the third value $U_{D3}$ in a negative sense relative to $U_{ref}$. The comparator 31.2 has an input 33.2 coupled to the input terminal 1, has an input 35.2 coupled to the point 37.2 of constant potential ($-U_{D4}$ relative to $U_{ref}$), and has an input 36.2 coupled to the point 38.2 of constant potential ($-U_{D5}$ relative to $U_{ref}$). The comparator 31.2 supplies a (thirteenth) electric signal, logic "1", when the input terminal 1 receives a pulse having an amplitude which, in a negative sense relative to $U_{ref}$, lies between the third and the fourth value, and supplies a (fifteenth) electric signal, logic "0", when the input terminal 1 receives a pulse having an amplitude which, in a negative sense relative to $U_{ref}$, lies between the fourth and the fifth value.

The outputs 39.1, 39.2, 40.1 and 40.2 of the comparators are coupled to inputs of the signal combination unit 45'. The signal-combination unit 45' supplies a control signal for the switching means $S_1'$. This control signal comprises two sub-control signals $CS_1$ and $CS_2$, which are applied to the control signal inputs 12.1 and 12.2 respectively via the outputs 46.1 and 46.2 respectively. The sub-control signal $CS_1$ controls the switch $S_{11}$ and the sub-control signal $CS_2$ controls the switch $S_{12}$.

The circuit operates as follows.

It is assumed that the switch $S_{12}$ is in position a-b, see FIG. 8c. The position of the switch $S_{11}$ is irrelevant and may be position "a-b" or position "c-b", see FIG. 8b. At the instant t-$t_1$ a positive pulse having an amplitude larger than $U_{D3}$ is applied to the input terminal 1, see FIG. 8a. Under the influence of this pulse the control signal generator means 13'" will generate a control signal $CS_2$, causing the switch $S_{12}$ to be set to position c-b, see FIG. 8c. Moreover, the switch $S_{11}$ will be set to position a-b if it is not yet in this position, see FIG. 8b. This is effected each time that a positive pulse having an amplitude larger than $U_{D5}$ is detected. The negative pulse at the instant t=$t_2$ having an amplitude larger than $U_{D3}$, see FIG. 8a, causes the switch $S_{11}$ to be set to position c-b, see FIG. 8b. Moreover, the switch $S_{12}$ is reset to position a-b, see FIG. 8c. This switch setting is obtained each time that a negative pulse having an amplitude larger than $U_{D5}$ is detected. At the instant $t_3$ a positive pulse of an amplitude larger than $U_{D4}$ but smaller than $U_{D3}$ is applied to the input terminal 1, see FIG. 8a. Again the switch $S_{12}$ is set to position c-b, see FIG. 8c. The switch $S_{11}$ is reset to position a-b, see FIG. 8b. At the instant $t_4$ a negative pulse of an amplitude larger than $U_{D4}$ but smaller than $U_{D3}$ is applied to the input terminal 1, see FIG. 8a. The switch $S_{11}$ is set to position c-b, see FIG. 8b and the switch $S_{12}$ is set to position a-b. The positive pulse having an amplitude larger than $U_{D5}$ but smaller than $U_{D4}$ received at that the instant $t_5$ only causes the switch $S_{11}$ to be set to position a-b, see FIG. 8b. Consecutive pulses of an amplitude between $U_{D5}$ and $U_{D4}$, such as the pulse at the instant $t_6$, see FIG. 8a, no longer cause the settings of the switches $S_{11}$ and $S_{12}$ to change.

If subsequently at an instant $t_7$ a positive pulse having an amplitude between $U_{D4}$ and $U_{D3}$ is applied to the input terminal 1, see FIG. 8d, this will not cause the setting of the switch $S_{12}$ to be changed. The same applies to the switch $S_{11}$ upon reception of the negative pulse at the instant $t_8$, which pulses has an amplitude between $U_{D4}$ and $U_{D3}$.

It is not until the positive pulse having an amplitude larger than $U_{D3}$ is received at the instant $t_9$, see FIG. 8d, that the switch $S_{12}$ is set to position c-b, see FIG. 8f. A negative pulse at the instant $t_{10}$, whose amplitude is larger than $U_{D4}$ and may be smaller than $U_{D3}$, now causes the switch $S_{11}$ to be set to position c-b, see FIG. 8c. Again it is evident that depending upon the prior situation a pulse having an amplitude between $U_{D4}$ and $U_{D3}$ causes a switch to be changed over to position c-b in the one case and not to be changed over in the other case.

Figure 9:
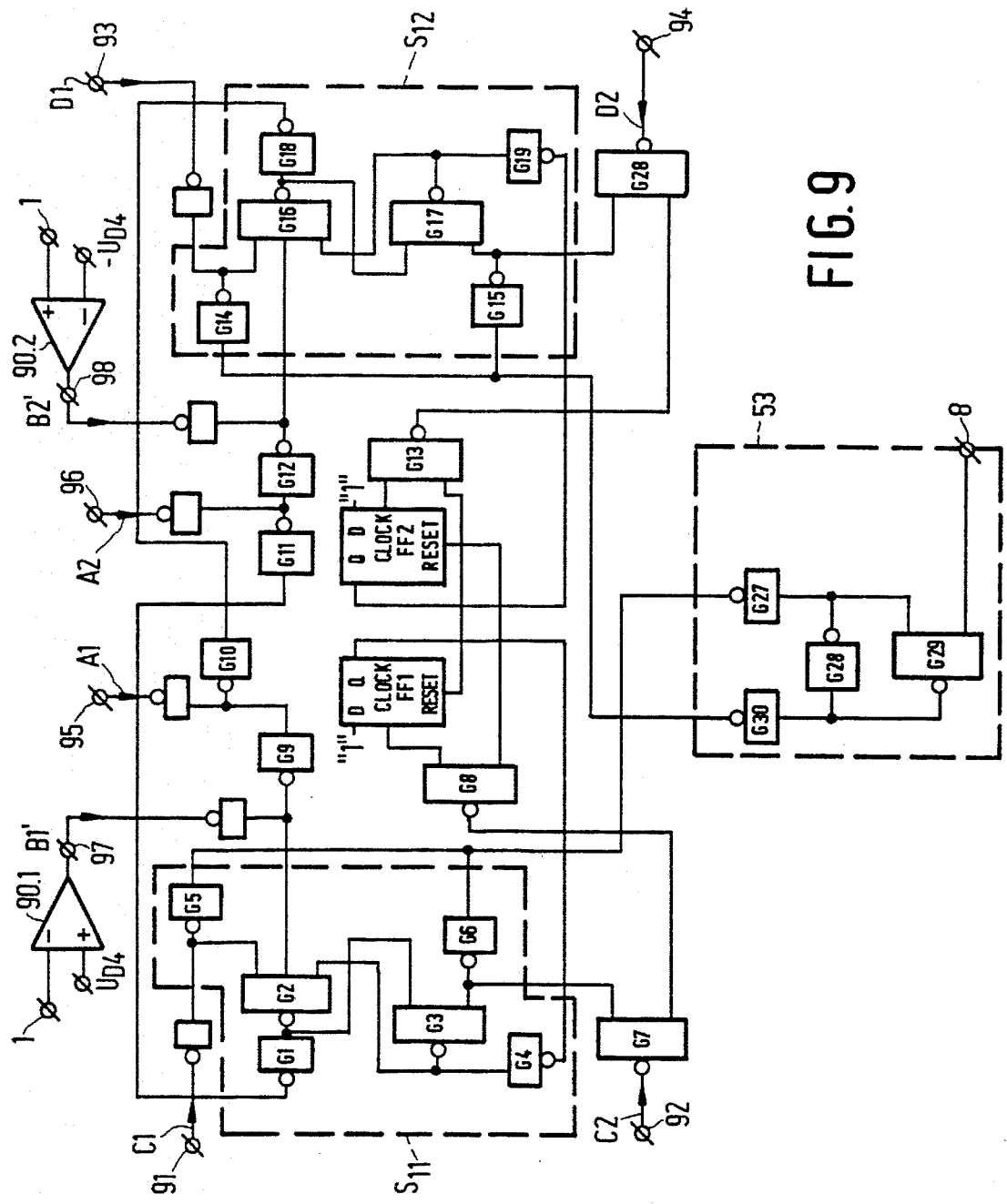
FIG. 9 shows the control signal generator means of the circuit shown in FIG. 7 further elaborated.

FIG. 9 shows an embodiment of the signal combination unit 45' in FIG. 7. The circuit comprises $I^2L$ logic devices as illustrated in FIG. 10a. FIG. 10b shows the circuit diagram of the device in FIG. 10a. The input 70 of the device is coupled to the base of an npn transistor 72. The collector of this transistor is coupled to the output 71 of the device. The positive supply voltage (+) is coupled to the base of the transistor 72 via a current source 73, which transistor has its emitter coupled to earth. The device operates as an inverter. When a logic "0" signal is applied to the input 70 the output 71 will be logic "1" and vice versa.

The operation of two these devices, see FIG. 11a, having their outputs coupled to one another, is illustrated by means of the Table in FIG. 11b. It is evident that the output of the device which is logic "0" is predominant. This means that only if the input signals $X_1$ and $X_2$ are both logic "0" the output signal y will be logic "1".

FIG. 12a shows a derive having two outputs 77 and 78. The circuit diagram of this device is shown in FIG. 12b. If the signal on the input 76 is logic "1" all the outputs are logic "0". If the input signal is logic "0" the output state will depend on whether an output is coupled to an output of another device. If the output of this other device is "high" the output of the device in FIG. 12 will also be "high" In the other case the output will be "low". The operation of devices having more than two outputs is identical to the operation of the device shown in FIG. 12.

The operation of the circuit shown in FIG. 9 can now be explained in more detail. First, it is to be noted that $U_{D5}$ is assumed to be equal to $U_{D2}$. This means that the comparators 31.1 and 31.2 in FIG.7 can now be constructed in the same way as the comparators 90.1 and 90.2, see FIG. 9: in these comparators the amplitude of the pulses need only be compared with $U_{D4}$ and $-U_{D4}$. FIG. 9 shows not only an example of the signal combination unit 45' but gives also more details of the two switches $S_{11}$ and $S_{12}$ and of the output flip-flop 53. Specifically, the gates G1, G2, G3 and G4 constitute the switch $S_{11}$ and the gates G16, G17, G18 and G19 constitute the switch $S_{12}$. Further, the gates G27, G28, F29, G30 constitute the output flip-flop 53.

The signal $C_1$, which is the output signal of the comparator 2.1, is applied to the circuit shown in FIG.9 via the terminal 91. This means that $C_1$ is logic "1" if a pulse has an amplitude larger than $U_{D1}$. The signal $C_2$, which is the output signal of the comparator 3.1, is applied to the terminal 92. Consequently, $C_2$ is logic "1" if the amplitude of the pulse is larger than $U_{D2}$.

The signal D1, i.e. the output signal of the comparator 2.2, is applied to the terminal 93. This means that D1 is logic "1" if the amplitude of a negative pulse is larger in absolute value than $U_{D1}$. The signal D2, which is the output signal of the comparator 3.2, is applied to the terminal 94, D2 consequently being logic "1" if the amplitude of a negative pulse is larger in absolute value than $U_{D2}$. The signal A1, which is the output signal of the comparator 30.1, is applied to the terminal 95. This means that A1 is logic "1" if the amplitude of a pulse is larger than $U_{D3}$. The signal A2, which is the output signal of the comparator 30.2, is applied to the terminal 96. This means that A2 is logic "1" if the amplitude of a negative pulse is larger in absolute value than $U_{D3}$. The signal B1' is applied to the terminal 97. B1' logic "0" if the amplitude of a pulse is larger than $U_{D4}$. The signal B2' is applied to the terminal 98. B2' is logic "0" if the amplitude of a negative pulse is larger in absolute value than $U_{D4}$.

The circuit operates as follows.

Assuming that a positive pulse of an amplitude larger than $U_{D3}$ is applied to the input terminal 1, the signal A1 on the terminal 95 causes the gate G10 to go to logic "0", so that the gate G18 goes logic "1" $S_{12}$ is now set. As a result of this, the gate G15 is "low" and the signal D2 cannot influence the output signal of $S_{12}$. In FIG. 7 this means that $S_{12}$ is in position c-b. The input signal applied to the gate G30, which constitutes the set input of the flip-flop 53, is now dictated by the signal D1, which can influence the gate G14. Normally, tile output signal of the gate G14 is logic "high" and the gate G30 is "low". When a negative pulse appearing on the input terminal has an amplitude whose absolute value is larger than $U_{D1}$ the gate G14 goes "low" and the gate G30 goes "high", so that the flip-flop 53 is set.

In conclusion, this weans that setting of the flip-flop 53 is determined by a negative pulse having an amplitude of an absolute value larger than $U_{D1}$ and not by a negative pulse having an amplitude of an absolute value larger than $U_{D2}$ (but smaller than $U_{D1}$!). Moreover, the gate G12 can go "high" if a negative pulse whose absolute amplitude is larger than $U_{D3}$ should appear on the input terminal 1. This is because of the signal B2' applied to the terminal 98. The gate G11 now goes "low", so that the signal A2 can no longer have any effect. The gate G1 goes "high", causing $S_{11}$ to be set. In FIG. 7 this weans that the switch $S_{11}$ is in position c-b. Thus, "setting" of $S_{11}$ is achieved by a negative pulse having an amplitude whose absolute value is larger than $U_{D4}$ and not by a negative pulse having an amplitude whose absolute value is larger than $U_{D3}$.

If $S_{12}$ had not first been set by a pulse having an amplitude larger than $U_{D3}$ (or $U_{D4}$), the setting of $S_{11}$ would have been dependent on tile presence or absence of a negative pulse having an amplitude of an absolute value larger than $U_{D3}$. Indeed, the gate $G_{12}$ would have been low then, regardless of the signal on the terminal 98.

When a positive pulse of an amplitude larger than $U_{D2}$ is applied the flip-flop FF1 will be set on the trailing edge of this pulse. Its output then goes "high" When the output of the flip-flop FF1 goes "high" $S_{11}$ is reset. When a negative pulse whose amplitude is larger in absolute value than $U_{D2}$ is applied the flip-flop FF2 is set, causing $S_{12}$ to be reset. FF1 is reset by means of the signal D2 upon a positive pulse of an amplitude larger than $U_{D2}$. When $S_{11}$ is reset the negative pulse whose amplitude is larger in absolute value than $U_{D2}$.

Likewise, FF2 is reset by means of the signal C2 upon a signal C2 is inhibited in the gate G6. When $S_{12}$ is set the signal D2 is inhibited in the gate G15. This means that a positive pulse of large amplitude is anticipated on account of the fact that the negative pulse preceding it had a large amplitude, and vice versa.

A positive pulse larger than $U_{D1}$ resets the flip-flop 54 by means of the signal C1 in tile same way as the negative pulse having an amplitude larger in absolute value than $U_{D1}$ has set the flip-flop 53 by means of the signal C1. Conversely, if a positive pulse of an amplitude smaller than $U_{D1}$ is received the flip-flop 53 is not reset. Since B1' now remains "high" $S_{12}$ is not set via the signal path G9, G10. This means that at the negative side the detection level is situated at $U_{D2}$. In turn, this means that G15 is no longer inhibited so that a negative pulse having an amplitude larger in absolute value than $U_{D2}$, i.e. the signal D2, can set the flip-flop 53. It is to be noted that the flip-flop 53 has already been set because the preceding positive pulse has not caused a reset signal for the flip-flop. This negative pulse does not intersect the $-U_{D3}$ level. As a result of this, the input A2 remains "low" and the switch $S_{11}$ is not set. Upon the next negative pulse the flip-flop 53 is reset by means of the signal $C_2$.

If subsequently the pulses remain smaller than $U_{D3}$ the flip-flop 53 is each time set and reset by the signals D2 and C2 respectively.

FIG. 13 illustrates the use of the circuit in accordance with the invention in a video recorder during reading of a video signal which has been recorded in tracks 81 which are inclined relative to the longitudinal direction of the record carrier 80. The record carrier 80 also has an auxiliary track 82 at the edge of and in the longitudinal direction of the record carrier. Track control pulses 83 are recorded, which are used for correctly controlling the speed of transport of the record carrier 80. For this purpose the pulses 83 are read by means of a stationary read head 84. The pulses read by the head 84 are applied to a read amplifier 86. The output 87 of the read amplifier 86 is coupled to the input terminal 1 of the circuit 85. Consequently, this circuit may be constructed in the same way as one of the embodiments described with reference to FIGS. 1 to 8.

For a further explanation of the operation of the video recorder reference is made to the book "Technik der magnetischen Videosignalaufzeichnung" by B. Morgenstern, published by B. G. Tember Stuttgart 1985, in particular Chapter 6 of this book.

We claim:

1. A circuit for detecting pulses in an electric input signal, comprising:

an input terminal for receiving the input signal;

first comparing means for receiving the input signal and comparing an amplitude of the pulse to a first constant signal having a constant potential;

second comparing means for receiving the input signal and comparing an amplitude of the pulse to a second constant signal having a constant potential;

said first comparing means outputting a first output signal when the pulse has a relative amplitude which exceeds the amplitude of the first constant signal;

said second comparing means outputting a second output signal when the pulse has a relative amplitude which exceeds the amplitude of the second constant signal; and switching means for receiving the output of the first comparing means and the second comparing means for selecting and outputting one of the first output signal and the second output signal;

said switching means for outputting the first output signal when the input terminal receives N1 pulses having an amplitude greater than the amplitude of the first constant signal and wherein the switching means selects and outputs the second output signal when the input signal includes N2 pulses having an amplitude greater than the amplitude of the second constant signal and less than the amplitude of the first constant signal absent an external clock signal, wherein N1 and N2 are integers.

2. The circuit of claim 1, wherein the amplitude of the input signal, first constant signal and second constant signal are normalized to a predetermined reference level.

3. The circuit of claim 1, wherein the N1 pulses are consecutive.

4. The circuit of claim 1, wherein the N2 pulses are consecutive.

5. The circuit of claim 1, wherein N1 is greater than or equal to one.

6. The circuit of claim 5, wherein N2 is greater than or equal to one.

7. The circuit of claim 1, further including counter means for counting the pulses having amplitudes greater than the amplitude of the first constant signal and outputting a switching signal to the switching means after counting N1 pulses.

8. The circuit of claim 7, wherein said counter means counts the pulses having amplitudes greater than the amplitude of the second constant signal and outputting a switching signal to the switching means after counting N2 pulses.

9. The circuit of claim 8, wherein said counter means counts the pulses having amplitudes greater than the amplitude of the second constant signal.

10. The circuit of claim 9, wherein the counter means includes a first counter having a count input, a reset input and an output for counting the N1 pulses and a second counter having a count input, a reset input and an output for counting the N2 pulses.

11. The circuit of claim 10, wherein the output of the first comparing means and the output of the second comparing means are coupled to the count input of the first counter and the reset input of the second counter through an AND gate and wherein the output of the second comparing means is coupled to the count input of the second counter and the output of the second counter is coupled to the reset input of the first counter.

12. The circuit of claim 1, wherein the first comparing means and the second comparing means each include one comparator.

13. The circuit of claim 1, wherein the first comparing means and the second comparing means each include a first comparator and a second comparator.

14. The circuit of claim 13, wherein the first comparator and the second comparator of the first comparing means and the first comparator and the second comparator of the second comparing means each receive the input signal.

15. The circuit of claim 14, wherein the first comparator of the first comparing means receives the first constant signal for comparing the amplitude of the first constant signal to the amplitude of the input signal.

16. The circuit of claim 15, wherein the second comparator of the first comparing means receives a third constant signal for comparing the amplitude of the third constant signal to the amplitude of the input signal.

17. The circuit of claim 16, wherein the first comparator of the second comparing means receives the second constant signal for comparing the amplitude of the second constant signal to the amplitude of the input signal.

18. The circuit of claim 17, wherein the second comparator of the second comparing means receives a fourth constant signal for comparing the amplitude of the fourth constant signal to the amplitude of the pulse.

19. The circuit of claim 18, wherein the first comparing means outputs the first output signal when the pulse has an amplitude which is one of greater than the amplitude of the first constant signal and less than amplitude of the third constant signal.

20. The circuit of claim 19, wherein the second comparing means outputs the second output signal when the pulse has a relative amplitude which is one of greater than the second constant signal and less than the fourth signal.

21. The circuit of claim 20, wherein the switching means receives the first output signal and second output signal for outputting the first output signal when the input terminal receives N1 pulses having one of an amplitude greater than the amplitude of the first constant signal and less than the amplitude of the third constant signal.

22. The circuit of claim 21, wherein the switching means outputs the second output signal when the input terminal receives N2 pulses having one of an amplitude greater than the amplitude of the second constant signal and less than the amplitude of the fourth constant signal.

23. The circuit of claim 22, wherein the amplitude of the first constant signal and the third constant signal have equal magnitude and opposite polarity.

24. The circuit of claim 23, wherein the amplitude of the second constant signal and the fourth constant signal have equal magnitude and opposite polarity.

25. A circuit for detecting pulses in an electric input signal, comprising:

an input terminal for receiving the input signal;

first comparing means for receiving the input signal and comparing an amplitude of the pulse to an amplitude of a first constant signal having a constant potential;

second comparing means for receiving the input signal and comparing an amplitude of the pulse to an amplitude of a second constant signal having a constant potential;

third comparing means for receiving the input signal and a third constant signal and comparing the amplitude of the pulse to an amplitude of the third constant signal having a constant potential;

fourth comparing means for receiving the input signal and a fourth constant signal and comparing the amplitude of the pulse to an amplitude of the fourth constant signal;

the first comparing means outputting a first output signal when the pulse has an amplitude which exceeds the amplitude of the first constant signal;

the second comparing means outputting a second output signal when the pulse has an amplitude which exceeds the amplitude of the second constant signal;

the third comparing means outputting a third output signal when the pulse has an amplitude which exceeds the amplitude of the third constant signal;

the fourth comparing means outputting a fourth output signal when the pulse has an amplitude which exceeds the amplitude of the fourth constant signal;

first switching means for receiving the output of the third comparing means and the fourth comparing means and for selecting and outputting one of the third output signal and the fourth output signal; and second switching means responsive to the output of the first switching means for selecting and outputting one of the first output signal and the second output signal.

26. The circuit of claim 25, wherein the fourth comparing means receives a fifth constant signal and wherein the fourth comparing means outputs the fourth output signal when the pulse has an amplitude which exceeds the amplitude of the fourth constant signal and is less the amplitude of the fifth constant signal.

27. The circuit of claim 26, wherein the magnitude of the third constant signal is greater than the magnitude of the fourth constant signal.

28. The circuit of claim 27, wherein the second switching means selects and outputs the first output signal after the input terminal has received N1 pulses having amplitudes exceeding the amplitude of the third constant signal and a subsequent pulse having an amplitude exceeding the amplitude of the fourth constant signal.

29. The circuit of claim 28, wherein the second switching means selects and outputs the second output signal after the input terminal has received N2 pulses having amplitudes between the amplitudes of the fourth constant signal and the fifth constant signal and a subsequent pulse having an amplitude not exceeding the amplitude of the third constant signal, wherein N1 and N2 are integers.

30. The circuit of claim 29, wherein N1=N2=1.

31. The circuit of claim 30, further including delay means for receiving the output of the first switching means and for inputting an output back to the first switching means.

32. A video recording apparatus including a circuit for detecting pulses in an electric input signal comprising a circuit for detecting pulses in an electric input signal, comprising:

an input terminal for receiving the input signal;

first comparing means for receiving the input signal and comparing an amplitude of the pulse to a first constant signal having a constant potential;

second comparing means for receiving the input signal and comparing an amplitude of the pulse to a second constant signal having a constant potential;

said first comparing means outputting a first output signal when the pulse has a relative amplitude which exceeds the amplitude of the first constant signal;

said second comparing means outputting a second output signal when the pulse has a relative amplitude which exceeds the amplitude of the second constant signal; and switching means responsive to the output of the first comparing means and the second comparing means for selecting and outputting one of the first output signal and the second output signal;

said switching means for outputting the first output signal when the input terminal receives N1 pulses having an amplitude greater than the amplitude of the first constant signal and wherein the switching means outputs the second output signal when the input signal includes N2 pulses having an amplitude greater than the amplitude of the second constant signal and less than the amplitude of the first constant signal absent an external clock signal, wherein N1 and N2 are integers.

33. A circuit for detecting pulses in an electric input signal, comprising:

an input terminal for receiving the input signal;

first comparing means for receiving the input signal and comparing an amplitude of the pulse to an amplitude of a first constant signal having a constant potential;

second comparing means for receiving the input signal and comparing an amplitude of the pulse to an amplitude of a second constant signal having a constant potential;

third comparing means for receiving the input signal and comparing an amplitude of the pulse to an amplitude of a third constant signal having a constant potential;

fourth comparing means for receiving the input signal and comparing an amplitude of the pulse to an amplitude of a fourth constant signal having a constant potential;

fifth comparing means for receiving the input signal and comparing an amplitude of the pulse to an amplitude of a fifth constant signal having a constant potential;

sixth comparing means for receiving the input signal and comparing an amplitude of the pulse to an amplitude of a sixth constant signal having a constant potential;

seventh comparing means for receiving the input signal and comparing an amplitude of the pulse to an amplitude of a seventh constant signal having a constant potential;

eighth comparing means for receiving the input signal and comparing an amplitude of the pulse to an amplitude of an eighth constant signal having a constant potential;

the first comparing means outputting a first output signal when the pulse has an amplitude which exceeds the amplitude of the first constant signal;

the second comparing means outputting a second output signal when the pulse has an amplitude which exceeds the amplitude of the second constant signal;

the third comparing means outputting a third output signal when the pulse has an amplitude which exceeds the amplitude of the third constant signal;

the fourth comparing means outputting a fourth output signal when the pulse has an amplitude which exceeds the amplitude of the fourth constant signal;

the fifth comparing means outputting a fifth output signal when the pulse has an amplitude which exceeds the amplitude of the fifth constant signal;

the sixth comparing means outputting a sixth output signal when the pulse has an amplitude which exceeds the amplitude of the sixth constant signal;

the seventh comparing means outputting a seventh output signal when the pulse has an amplitude which exceeds the amplitude of the seventh constant signal;

the eighth comparing means outputting an eighth output signal when the pulse has an amplitude which exceeds the amplitude of the eighth constant signal;

control means for receiving the fifth output signal, sixth output signal, seventh output signal and eighth output signal and outputting a first control signal and a second control signal;

first switching means responsive to the first control signal for selecting one of the first output signal and the second output signal; and second switching means responsive to the second control signal for selecting one of the third output signal and the fourth output signal.

34. The circuit of claim 33, wherein the amplitude of the fifth constant signal and the sixth constant signal have equal magnitude and opposite polarity.

35. The circuit of claim 33, wherein the seventh comparing means receives a ninth constant signal and outputs the seventh output signal when the pulse has an amplitude which exceeds the amplitude of the seventh constant signal and is less than an amplitude of the ninth constant signal.

36. The circuit of claim 35, wherein the eighth comparing means receives a tenth constant signal and outputs the eighth output signal when the pulse has an amplitude which exceeds the amplitude of the eighth constant signal and is less than an amplitude of the tenth constant signal.

37. The circuit of claim 36, wherein the seventh constant signal and the eighth constant signal have equal magnitude and opposite polarity.

38. The circuit of claim 37, wherein the ninth constant signal and the tenth constant signal have equal magnitude and opposite polarity.

39. The circuit of claim 38, wherein the first constant signal has a magnitude greater than a magnitude of the second constant signal.

40. The circuit of claim 39, wherein a magnitude of the fifth constant signal is greater than a magnitude of the seventh constant signal and wherein the magnitude of the seventh constant signal is greater than a magnitude of the ninth constant signal.

* * * * *